US 6,665,083 B1

(12) United States Patent
Nakajima et al.

(10) Patent No.: US 6,665,083 B1
(45) Date of Patent: *Dec. 16, 2003

(54) COMPUTER-READABLE RECORDING MEDIUM FOR RECORDING PHOTOGRAPH PRINT ORDERING INFORMATION

(75) Inventors: Nobuyoshi Nakajima, Kanagawa-ken (JP); Shuichi Ohtsuka, Kanagawa-ken (JP); Norihisa Haneda, Saitama-ken (JP); Kazuo Shiota, Tokyo (JP); Shinji Itoh, Kanagawa-ken (JP)

(73) Assignee: Fuji Photo Film Co., Ltd., Kanagawa-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,150

(22) Filed: Apr. 1, 1998

(30) Foreign Application Priority Data

Apr. 1, 1997 (JP) ............................................. 9-082991

(51) Int. Cl.[7] .............................................. G06K 15/00
(52) U.S. Cl. ........................................ 358/1.15; 358/1.9
(58) Field of Search ........................ 358/1.1, 1.2, 1.6, 358/1.9, 1.12, 1.13, 1.15, 1.16, 432, 501; 347/1, 9, 22, 40; 394/8, 16, 130, 131, 361; 709/206

(56) References Cited

U.S. PATENT DOCUMENTS

| | | | | |
|---|---|---|---|---|
| 5,327,265 A | | 7/1994 | McDonald | 358/527 |
| 5,426,594 A | | 6/1995 | Wright et al. | 709/206 |
| 5,477,353 A | * | 12/1995 | Yamasaki | 358/487 |
| 5,512,396 A | | 4/1996 | Hicks | 430/21 |
| 5,701,451 A | * | 12/1997 | Rogers et al. | 707/1 |
| 5,784,461 A | * | 7/1998 | Shaffer et al. | 705/51 |
| 5,790,793 A | * | 8/1998 | Higley | 709/206 |
| 5,799,219 A | * | 8/1998 | Moghadam et al. | 396/319 |
| 5,859,652 A | * | 1/1999 | Silverbrook | 347/2 |
| 5,859,920 A | * | 1/1999 | Daly et al. | 382/115 |
| 5,895,464 A | * | 4/1999 | Bhandari et al. | 707/3 |
| 5,913,088 A | * | 6/1999 | Moghadam et al. | 396/311 |
| 6,122,649 A | * | 9/2000 | Kanerva et al. | 707/515 |

FOREIGN PATENT DOCUMENTS

GB       2286944 A       8/1995

OTHER PUBLICATIONS

Pipeline's Internet Printing System Lets the Printer Surf the Web, Observer, products, Mar. 1997, pp. 45 and 46.*
Robert Blumberg et al., "Visual Realism and Interactivity for the Internet," Proceedings of IEEE Compcon 1997, pp. 269–273.

* cited by examiner

*Primary Examiner*—Gabriel Garcia
(74) *Attorney, Agent, or Firm*—Birch, Stewart, Kolasch & Birch, LLP

(57) ABSTRACT

In a digital photographic image printing system, method, and recording medium, photographic print ordering information is stored as a storage file having a hierarchically structured format, and which is exchanged as an order file in a digital format. Any change in the content or operation of the system can be dealt with more flexibly by use of the hierarchically structured storage file, without requiring extensive changes to the underlying variety of application programs that may use the order information in the hierarchically structured order file. The structured storage file includes an orderer stream describing customer information, and an order storage that describes the content of an order. Within the order storage, a link information stream is provided which describes the location of digital photographic image data stored on a network and which is to be printed, and an order content stream is also provided which describes the content of the order, including print quantity, size, and desired finishing or other processing details.

23 Claims, 3 Drawing Sheets

COMPUTER-READABLE RECORDING MEDIUM FOR RECORDING PHOTOGRAPH PRINT ORDERING INFORMATION

BACKGROUND OF THE INVENTION

1. Field of the Invention

The present invention relates to a recording medium exchanged between a customer and a printing service provider upon placing an order of photograph print, and more specifically to a data structure of the ordering information to be recorded in the recording medium.

2. Description of the Related Art

An order of photograph print is placed by filling an order sheet with the name and address of an orderer, the frame number and the quantity of photographs to be printed, the size of the photograph print, and the like.

However, digitization of photographic services has been taking place recently, and it is being realized to order photograph print by bringing in a medium such as an MO disc, a Zip disc, and a CD-R wherein image data having been digitized by reading a film are recorded. Alternatively, a method has been proposed wherein image data are registered in a server computer of a service provider in advance and printing is carried out without exchanging a medium.

Following the digitization, it has been proposed that ordering information, which used to be provided from a customer to a service provider in an order sheet, should also be provided as digital data.

In the current printing services using image data, an order is placed by filling an order sheet with a file name of image data to be printed among image data recorded in a recording medium brought in (or among image data having been registered in a server computer). Therefore, as a method to describe ordering information taking the form of digital data, a data format has been proposed wherein the content of a conventional order sheet is merely digitized as it is. More specifically, the size of a field for each kind of information is defined, such as the first 16 bytes of the name of an orderer, the following 48 bytes the address, and thereafter, for each order, 12 bytes of a file name, 2 bytes of the quantity, and 2 bytes of the size.

Following the spread of personal computers and the Internet, a variety of completely new needs have been arising regarding photograph printing services.

As one of such needs, it is expected to enrich the kinds of image data to be specified as printing targets. In other words, following the proposals of network photograph systems or the like which receive printing orders on the Internet, a need of printing a photograph image available on the Internet, not a photograph the customer has at hand, emerges for example.

However, since the network photograph systems which have been proposed so far are the systems to order printing of photographs which printing service providers manage (for example, the photographs which a customer of a printing service provider has registered), the case such as the above has not been considered. Therefore, if a customer wishes to print a photograph managed (published) on a server computer by a party other than the printing service provider of the customer, the customer has to download the image file, store the file in a removable medium and order printing in the same manner as for his/her own photographs in hand.

Another expectation is to enrich the kinds of image processing to be carried out on image data. In other words, in a digital photograph service which is different from exposure printing, various kinds of image processing can be carried out on image data. Therefore, it is expected that a customer who used to grumble about the bad finish of a photograph and have no choice but to give up and nationalize that it is a failure of photographing will now be able to place a detailed order regarding image processing, such as including red eye correction data in the order and thus be satisfied with the finish.

The content of the image processing which a service provider can provide as photograph image finishing processing may vary in accordance with the improvement of technologies. Following this change, it is possible for the data format of ordering information to change frequently. Furthermore, if delivery processing of finished prints becomes automated, the number and the kind of programs which refer to the ordering information for processing will increase. On this occasion, the ordering information exploring the conventional data structure described above is not preferable, because all programs incorporated in a photograph finishing system need to be modified regarding a field referred therein (i.e., every time the data structure is changed).

Therefore, it is preferable that the data structure of ordering information be able to deal with the new needs described above and flexibly cope with the needs which may emerge in the future.

SUMMARY OF THE INVENTION

The present invention includes a computer-readable recording medium for recording photograph print ordering information therein, wherein the ordering information is recorded as a structured storage file having a hierarchy structure, the structured storage file comprising an orderer stream describing information regarding an orderer and at least one order storage describing the content of an order, and the order storage comprising a link information stream describing link information to photograph image data to be printed and an order content stream describing the content of the order regarding the photograph image data having been pointed out by the link information.

The structured storage file having a hierarchy structure herein referred to is used when different kinds of applications handle one file. One structured storage file has a hierarchy structure which is similar to a directory in a conventional file system, and each component thereof can be handled by different applications. A stream is a component of structured storage and a storage stores a stream (equivalent to the function of a conventional directory). Since the structured storage is widely known as a technique used in Component Object Model (COM) proposed by the Microsoft Corp., its detailed explanation is not provided here.

The ordering information of the present invention described above has only the name and address as the information regarding an orderer, for example. When the function is extended so that the ordering information includes an E-mail address, the photograph finishing system in order to deal with the ordering information has to be modified only with regard to the programs referring to the information regarding an orderer, and does not need to be modified on the other programs such as programs for image processing, for example. In other words, labor for program modification due to a change in a function will be greatly saved.

Another feature of the present invention is to specify a target of printing by link information, not by the name of a file thereof. The link information means, for example, a character string such as "\fujifilm.co.jp\filename.fpx". This is to specify a target of printing in a more general form adaptable to a network, and a conventional file name can be treated as a kind of link information by including a path name therewith such as "C:\IMAGES\filename.fpx".

A system of the present invention receives ordering information stored on such a data structure and creates photograph prints. In other words, the system deals with the computer-readable recording medium for recording the ordering information of photograph prints, and includes recording means which store a digitized photograph as image data, ordering information reading means which reads the ordering information recorded in the recording medium, printing target searching means which receives from a predetermined object instance recognizing means a pointer for handling the photograph image data by providing to the object instance recognizing means the link information included in the ordering information having been read by the ordering information reading means, and print generating means which generates the print by referring to the image data by using the pointer obtained by the printing target searching means.

As in a conventional system, the "recording means" means a removable medium such as a FD, an MO disc, a Zip disc, or a hard disc of a computer managed by a DPE or a laboratory. However, a hard disc of a computer owned by a DPE other than the one which receives an order is included as the recording means in the present invention.

Therefore, it is preferable that the photograph image data be stored in a standardized format having higher generality, rather than in an original format adopted by one company. As such a format, FlashPix Format having been proposed by several companies headed by the Eastman Kodak Company as a standard format of digital image, or Exif format which is an image file format for a digital still camera and proposed by Japan Electronic Industry Development Association can be used.

A great difference between a conventional system and the one according to the present invention lies in the manner in which a photograph image file is searched for or identified by the printing target searching means. In other words, in a conventional system, it is predetermined where to store a photograph image file, and a printing target searching means finds a target file by sequentially searching files having been stored in the predetermined storage location. On the other hand, the printing target searching means of the present invention provides the link information shown by the ordering information to the predetermined object instance recognizing means, and the object instance recognizing means searches for a target file and returns to the printing target searching means the pointer of the file having been found. In other words, the printing target searching means of the present invention does not need a detailed regulation on where to store photograph image data, and a storage location of photograph image files has a very high degree of freedom.

The object instance recognizing means is analog is to an "OLE moniker" or a "URL moniker" in the OLE technology or in the ActiveX technology proposed by the Microsoft Corp. However, the object instance recognizing means is not necessarily limited to the above, and may be a means which plays the same role in another object oriented model. The format of the link information is meant to follow a standard class which has been defined in accordance with the moniker.

In an object oriented model, the details of an object are generally not seen by a client. A moniker is used to carry out for a client various kinds of processing which should be carried out in order to use the object. By using a moniker, a client can utilize a necessary object without performing complex processing itself.

Therefore, it is not necessarily required to use an object through a moniker if the storage locations of objects are limited a (easy to remember where objects have been stored) and an object can be used easily. In other words, in a conventional photograph finishing system wherein the storage location of photograph image data is limited to a removable medium or a hard disc of the system, it is meaningless to use a moniker.

However, since the printing service which Fuji Photo Film Co. Ltd. is going to provide does not restrict where photograph image files are stored, the stem needs to search all accessible recording means for target photograph image data. For example processing including searching for the target file, connecting to a computer wherein the target file is stored, or transferring the photograph image data from the computer, can be carried out effectively by using the moniker.

In other words, by using the moniker, the printing target searching means can, without considering the difference between remote files and local files, search for a printing target file easily by the same processing for both kinds of files. Furthermore, the search for a printing target can be carried out by the same processing in both cases where a photograph image is stored as an individual file and as data embedded in a file.

However, the system of the present invention does not exclude the form of photograph image data storage in a limited location as has been adopted in a conventional system.

The data structure of the ordering information of the present invention is advantageously utilized to improve processing effectiveness of a photograph finishing system or modification effectiveness upon function extension. It is obviously not preferable to force a customer to generate ordering information to accommodate the data structure. Therefore, it is preferable that a service provider provide its customers with personal computer application software or the like which can easily record the ordering information in a recording medium.

A recording medium readable by a computer stores such a software program described above whereby a computer executes processing of inputting information regarding an orderer of a printing order, inputting link information to image data to be printed, inputting information regarding the content of the printing order, describing the information regarding the orderer in an orderer stream, describing the link information in a link information stream, and describing processing regarding the content of the order in an order content stream.

According to the computer-readable recording medium for recording the ordering information of photograph print, the ordering information is recorded in the form of a structured storage file having a hierarchy in the recording medium. Therefore, if details of each stream composing the file are changed, only programs referring to the stream need to be modified in the system, and a system which is substantial upon function extension can be realized.

Furthermore, since a printing target is described in the ordering information as the link information rather than by a conventional file name thereof, the range of photograph image data which can be specified as a printing target is extended. For example, according to this form of specifying a photograph, not only a conventional individual image file but also image data embedded in a document file can be specified as a printing target.

On this occasion, the system of the present invention searches for the image data by using the moniker. Since the link information specified in the ordering information is used as it is as a parameter to be handed to the moniker and used in the search, it is not necessary for the photograph finishing system to have an original file managing function (for example, compiling a table relating an image file to its storage location). In other words, labor needed for system maintenance will be greatly reduced.

Moreover, since an application which can record the ordering information in a medium easily on a personal computer is provided by the recording medium wherein the program of the present invention is recorded, customers can use a more improved printing service as easily as they use a conventional service.

DESCRIPTION OF THE PREFERRED EMBODIMENTS

Figure 1:
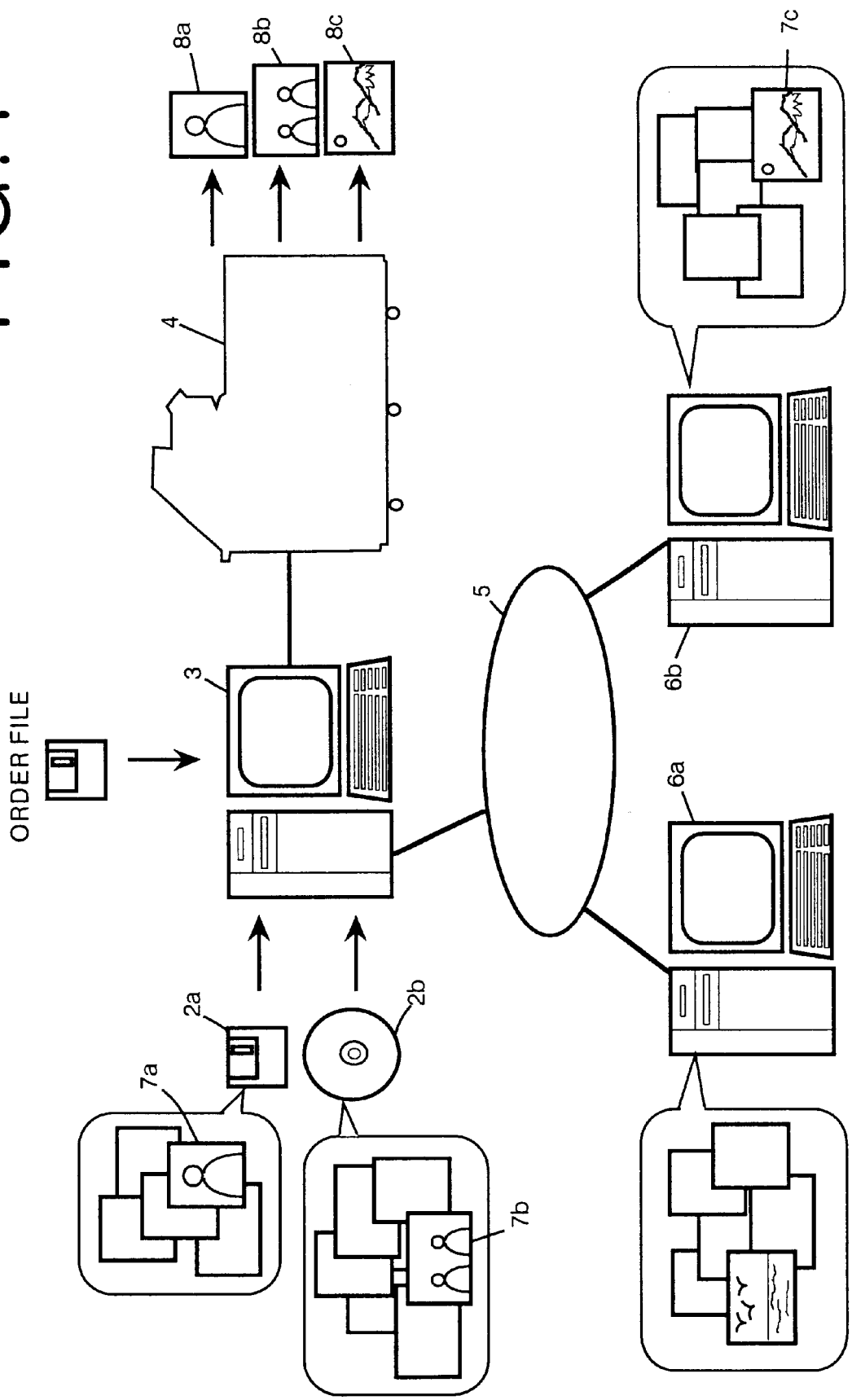
FIG. 1 is a diagram showing an embodiment of a photograph finishing system of the present invention.

Hereinafter, a recording medium for recording an ordering information and a photograph finishing system of the present invention will be described with reference to the accompanying drawings. FIG. 1 is a diagram showing an embodiment of the photograph finishing system of the present invention. The system mainly comprises a server computer 3 which processes printing orders placed by customers and a photographic printer 4 which generates photograph prints in the size and the quantity specified on the printing orders.

The server computer 3 is connected to the Internet or the like (network 5), and can exchange upon necessity photograph image data with other server computers 6a and 6b, which manage photograph image data.

A customer saves in a medium such as an MO disc or a Zip disc a photograph image 7 to be printed and an order file describing the content of an order, and hands in the medium to a DPE. Meanwhile, the server computer 3 receives the order by reading the order file in the medium and generates a photograph print 8.

Alternatively, according to the system of the present invention, an order can be placed by providing to a DPE a medium wherein only an order file is stored. For example, in the case where a professional photographer has been publishing his/her work (photograph image 7c) on the Internet and wishes to generate photograph print 8c using the photograph 7c, he/she can order the printing even when the photograph has been published without involving a printing service provider. In other words, in the present system, it is not necessary for an orderer of printing to download an image file as long as link information to the image file is known.

It is assumed that printable photograph image data are recorded in the FlashPix format in the present embodiment in order to guarantee photograph print quality higher than a certain level. In other words, as a spirit of the invention, the format of photograph image data is not specifically restricted.

Figure 2:
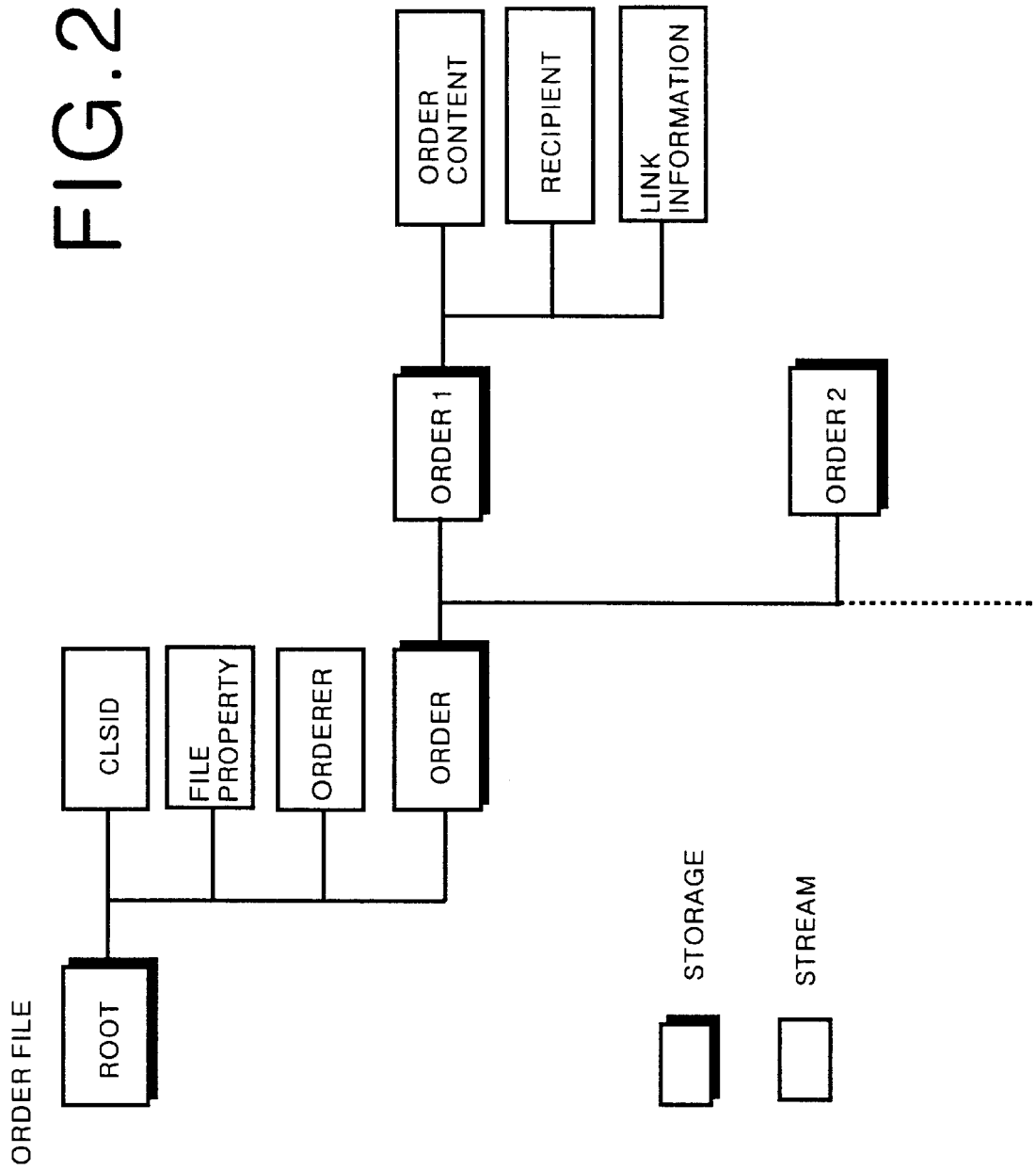
FIG. 2 is a diagram showing an example of an order file structure.

FIG. 2 shows the structure of an order file used in the present invention. As shown in FIG. 2, ordering information of the present invention to be recorded in a recording medium has the form of a structured storage file wherein a stream showing an object class identifier (CLSID), property information of an order file, and information regarding an orderer, as well as a storage storing specific information regarding the order exists under a root storage. The storage comprises one order storage for one order, and each order storage comprises an order content stream describing the quantity, the size or the like of print, a recipient stream describing information regarding a recipient of the print, and a link information stream to image data to be printed, for example.

The recipient stream is used in the case where extra prints of a photograph are ordered and the prints will be distributed to the orderer's friends, for example. The order storage may come immediately under the root storage, and the number of hierarchy level shown in the example in FIG. 2 does not restrict the present invention.

Hereinafter, the content of each stream will be described in detail. In the present embodiment, three kinds of information shown in Table 1 is described as property information of an order file. An order file standard version is version management information by which the photograph finishing system tells an order file before and after a change in the order file structure due to function extension or the like. Date of order file generation is the date on which a customer generates the order file. Order file generating software means the kind and the version of personal computer application software which the customer uses upon generating the order file. In the following tables, the data type (Type) of each kind of information shows the data type defined in the FlashPix standard.

TABLE 1

| Information Name | Type | Notes |
| --- | --- | --- |
| Order File Standard Version | VT_LPSTR | Example: v.1.00 |
| Date of Order File Generation | VT_FILETIME | |
| Order File Generating Software | VT_LPWSTR | |

The orderer stream and the recipient stream describe information regarding an orderer and a recipient respectively, and, as shown in Table 2 below, both streams have information describing the name and address, the phone number, the fax number, the E-mail address or the like for each customer.

TABLE 2

| Information Name | Type | Notes |
| --- | --- | --- |
| [Name Group] | | |
| Last Name | VT_LPWSTR | Example: Fuji |
| Middle Initial | VT_LPWSTR | |
| First Name | VT_LPWSTR | Example: Taro |
| [Address Group] | | |
| ZIP Code | VT_LPSTR | Example: 250–01 |
| Country | VT_LPWSTR | Example: Japan |
| State | VT_LPWSTR | Example: Kanagawa |
| City/Town | VT_LPWSTR | Example: Ashigara-kami-gun |
| Address | VT_LPWSTR | Example: 798 Miyadai, Kaisei-Cho |

TABLE 2-continued

| Information Name | Type | Notes |
|---|---|---|
| [Number Group] | | |
| Country Code | VT_LPSTR | Example: 81 |
| Area Code | VT_LPSTR | Example: 0465 |
| Phone Number | VT_LPSTR | Example: 123–4567 |
| FAX number | VT_LPSTR | Example: 123–4568 |
| E-mail Address | VT_LPSTR | Example: aaa@miya.fujifilm.co.jp |

As shown in Table 3 below, the order content stream describes information regarding reception of finished prints, such as whether it will be received over the counter or by delivery, the kind of service, the kind of postcards when printing on postcards is specified as the kind of service, the variety of photographic paper, the size of print, the number of print, and the margin width.

The kind of image processing which is carried out on image data upon printing processing is also described. As the kind of image processing, sunset finish for making a print of a sunset look like a beautiful sunset, snow finish for expressing a scene of snow, perspective finish processing for emphasizing distance, painting finish for making a print look magnificent as an oil painting, sharp finish for emphasizing sharpness in the finish, scenery finish for emphasizing a scenery, portrait finish for expressing a beautiful complexion, soft finish for expressing softness in the finish, high key finish for making a print look to be in a high key, low key finish for making a print look to be in a low key, reversal finish for making colors spread well, monochrome finish for finishing a print in monochrome, sepia finish for finishing a print in sepia color, gloss finish for expressing gloss or luminosity, and red correction finish for correcting red colors or the like can be listed.

On the contrary, some users do not wish a service provider to carry out any correction processing. Therefore, it is preferable that no correction, that is, no processing to be carried out, is also included as a choice regarding the finish.

Furthermore, as for trimming processing, if a detailed specification of the area to be trimmed is left to a service provider's discretion and a user only specifies a rough area to be trimmed, such as an area including a figure or two figures at the center of a photograph, this information can be included as a choice of the image processing. Alternatively, a user can specify in detail the area to be trimmed by separately including in the stream a field describing the coordinates of the area to be trimmed.

Table 4 below shows the sizes which can be used for a variety of services.

TABLE 3

| Information Name | Type | Notes |
|---|---|---|
| Delivery and/or Reception method | VT_U14 | 0: Over the Counter |
| Kind of Service | VT_U11 | 1: normal Prints<br>2: DSC Prints<br>3: Postcard Prints |
| Specification | VT_U11 | Effective Only for Postcard Prints<br>1: New Year Greeting Cards, 2: Spring Greeting Cards, 3: Summer |

TABLE 3-continued

| Information Name | Type | Notes |
|---|---|---|
| | | Greeting Cards, 4: Postal Cards, 5: Other Postcards |
| Kind of Photographic Paper | VT_U11 | 0: Standard |
| Print Size Name | VT_U11 | See Table 4 |
| Print Size (Width) | VT_U12 | See Table 4 |
| Print Size (Length) | VT_U12 | See Table 4 |
| Quantity | VT_U12 | Any number from 1 to 9999 |
| Have Print Margin? | VT_U11 | 1: No Margin |
| Print Margin Width (Horizontal) | VT_U12 | 0 (mm) |
| Print Margin Width (Vertical) | VT_U12 | 0 (mm) |
| Image processing Specification | VT_U12 | 1: Sunset Finish, 2: Snow Finish, 3: Perspective Finish, 4: Painting Finish, 5: Sharp Finish, 6: Scenery Finish, 7: Portrait Finish, 8: Soft Finish, 9: High Key Finish, 10: Low Key Finish, 11: Reversal Finish, 12: Monochrome Finish, 13: Sepia Finish, 14: Gloss Finish, 15: Red Eye Correction Finish, 16: No correction, 17: Trimming (One FIG.), 18: Trimming (Two FIGS.) |

TABLE 4

| | Print Size Name | Print Size (Width) | Print Size (Length) |
|---|---|---|---|
| Normal Printing | 1: C Size | 89 mm | 127 mm |
| | 2: H Size | 89 mm | 158 mm |
| | 3: P Size | 89 mm | 254 mm |
| | 4: A5 Size | 210 mm | 148 mm |
| | 5: A4 Size | 210 mm | 297 mm |
| DSC Printing | 1: DSC Size | 89 mm | 114 mm |
| Postcard Printing | 0: No Specification | 102 mm | 146 mm |

The link information stream is described as "\\fujifilm.co.jp\filename.fpx", for example.

Figure 3:
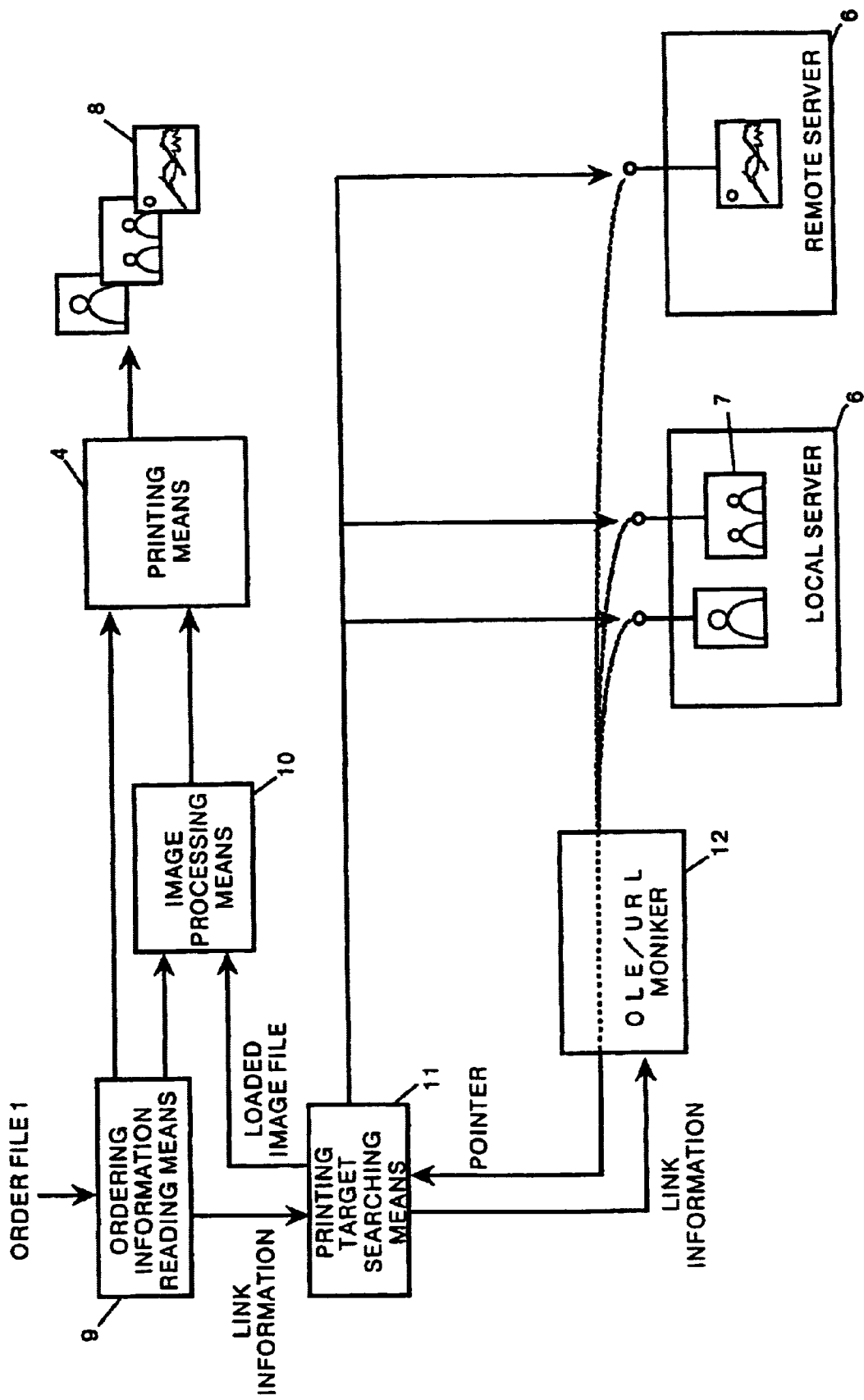
FIG. 3 is a diagram showing a role of a moniker.

Hereinafter, the processing which is carried out by the server computer 3 will be described with reference to FIG. 3. Ordering information reading means 9 of the system analyzes an order file 1 read from a recording medium, extracts link information therefrom and provides the information to printing target searching means 11. The ordering information reading means 9 and the printing target searching means 11 are software operating on the server computer 3 and can be implemented as a part of the photograph finishing system.

Meanwhile, an OLE/URL moniker 12 is a function of a tool for an object oriented system which has been proposed by the Microsoft Corp. More specifically, the OLE/URL moniker 12 is a set of interfaces for handling a specified object while using the link information. Monikers are known as an OLE technology of the Microsoft Corp.

The printing target searching means 11 uses some interfaces provided as functions of the moniker, and obtains a pointer showing a photograph image specified by the link information. Furthermore, the printing target searching means loads the target photograph image data on a memory of the system by using the pointer having been obtained.

The loaded photograph image data are then sent to image processing means 10 whereby image processing for enhancing photograph print quality is carried out. The ordering information regarding image processing is separately sent from the ordering information receiving means 9 to the image processing means 10, and the specified image processing based on the information (such as sunset finish or snow finish) is carried out. Processing other than the above, for example, interpolating enlargement processing when the number of pixels in the image data is not sufficient to print the image in the specified size, or correction processing for colors or density, is carried out upon necessity.

The image-processed data are transferred to the printing means 4 and photograph print 8 is generated. A digital photographic printer which prints digital image data read by a conventional film scanner or the like can be used as the printing means 4.

According to the photograph finishing system having been described above, a customer can easily place an order to print not only image data the customer has at hand but also image data available on a network. A service provider does not need to spare his/her time so much on maintenance such as updating a table, and can carry out a series of processing from order reception to print generation more smoothly. Furthermore, since the workload on system modification due to a change in the structure of the order file is not heavy, a new service can be provided to customers more quickly, which has extremely high effectiveness in actual practice.

What is claimed is:

1. A computer-readable recording medium for recording photograph print ordering information therein, wherein
   the photograph print ordering information is recorded as at least one structured storage file having a hierarchical structure;
   the at least one structured storage file including an orderer stream describing information regarding an orderer and at least one order storage describing content of an order; and
   the at least one order storage having at least one link information stream describing link information to photograph image data to be printed and an order content stream describing the content of the order regarding the photograph image data having been pointed out by the link information, said order content stream including a print size and a print quantity.

2. A system dealing with the computer-readable recording medium for recording photograph print ordering information as claimed in claim 1, the system comprising:
   a server including a recorder which records at least one digitized photograph as photograph image data,
   an ordering information reader which reads the photograph print ordering information recorded in the computer-readable recording medium, and
   a printing target searcher which receives from a predetermined object instance generator a pointer for handling the photograph image data by providing the link information included in the ordering information having been read by the ordering information reader to the object instance generator; and
   a printer which generates at least one print by referring to the photograph image data by using the pointer obtained by the printing target searching means.

3. A computer-readable recording medium as claimed in claim 1 which stores a program whereby a computer executes processing for recording the ordering information, the processing comprising:
   inputting link information to photograph image data to be printed;
   inputting information regarding the content of the order;
   describing the information regarding the orderer as the orderer stream;
   describing the link information as the link information stream; and
   describing the processing regarding the content of the order as the order content stream.

4. The computer-readable recording medium for recording print ordering information of claim 1, wherein the structured storage file further includes a recipient stream including at least one recipient name, address, phone number, fax number or email address.

5. The computer-readable recording medium for recording print ordering information of claim 1, wherein the orderer stream further includes at least one orderer name, address, phone number, fax number or email address.

6. The computer-readable recording medium for recording print ordering information of claim 1, wherein the order content stream further includes at least one type of photographic paper used for printing, whether at least one order is for pickup or delivery, at least one print size, at least one number of prints or at least one margin width.

7. The computer-readable recording medium for recording print ordering information of claim 1, wherein the ordering information is used to generate photographic prints.

8. The computer-readable recording medium for recording photograph print ordering information of claim 2, wherein the predetermined object instance generator includes a moniker.

9. The computer-readable recording medium for recording photograph print ordering information of claim 8, wherein the moniker comprises an OLE (Object Linking and Embedding) moniker or an URL (Uniform Resource Locator) moniker.

10. A system for photographic image print order fulfillment, the system comprising:
    a server, having an order information reader for reading hierarchically-stored photographic image print order information from a computer-readable storage medium and extracting link information of at least one location of at least one photographic image on a network, said photographic image print order information including a print size and a print quantity read from an order content stream,
    a photographic image searcher for receiving from an object instance generator a generated pointer for identifying the at least one photographic image, wherein the object instance generator uses the extracted link information to generate the pointer for identifying the at least one photographic image, and
    a photographic image storage for storing the at least one photographic image identified by the generated pointer.

11. The photographic image print order fulfillment system of claim 10, wherein a printer generates the at least one photographic image identified by the generated pointer.

12. The photographic image print order fulfillment system of claim 10, wherein the server further includes a photographic image recorder for recording from the computer-readable storage medium at least one digitized photograph as photograph image data.

13. The photographic image print order fulfillment system of claim 12, wherein a printer further generates at least one photographic image print from the photograph image data.

14. The photographic image print order fulfillment system of claim 12, wherein the at least one digitized photograph recorded as photograph image data is recorded in a FlashPix or Exif format.

15. A method of photographic image print order fulfillment, the method comprising:
- reading hierarchically-stored photographic image print order information from a computer-readable storage medium;
- extracting link information of at least one location of at least one photographic image on a network from the photographic image print order information;
- generating a pointer for identifying the at least one photographic image, wherein the extracted link information is used for generating the pointer for identifying the at least one photographic image; and
- storing the at least one photographic image print identified by the generated pointers,
- wherein said reading hierarchically-stored photographic image print order information includes at least reading an order content stream having a print size and a print quantity.

16. The photographic image print order fulfillment method of claim 15, wherein a printer generates the at least one photographic image identified by the generated pointer.

17. The photographic image print order fulfillment method of claim 15, wherein at least one digitized photograph is read from the computer-readable storage medium and stored as photograph image data.

18. The photographic image print order fulfillment method of claim 17, wherein a printer generates at least one photographic image print from the photograph image data.

19. The photographic image print order fulfillment method of claim 15, wherein the at least one digitized photograph read from the computer-readable storage medium as photograph image data is stored in a FlashPix or Exif format.

20. A computer-readable recording medium for storing photograph print order information therein, wherein:
- the photograph print order information is stored as at least one structured storage file having a hierarchical structure, and
- includes link information of at least one location of at least one photographic image on a network,
- wherein said hierarchical structure includes at least an order content stream containing a print size and a print quantity.

21. The computer-readable recording medium for storing photograph print order information of claim 20, wherein the photograph print order information is used, to generate photograph prints.

22. A computer implemented method for storing photograph print order information on a computer-readable recording medium, comprising the steps of:
- accepting photograph print order information from a user;
- accepting link information from the user, whereby the link information includes at least one location of at least one photographic image on a network; and
- storing the photograph print order information on the computer-readable recording medium as at least one structured storage file having a hierarchical structure,
- wherein said hierarchical structure includes at least an order content stream containing a print size and a print quantity.

23. The computer implemented method for storing photograph print order information of claim 22, wherein the photograph print order information is transmitted to a photo finishing system for generating photograph prints.

* * * * *